May 15, 1934.   R. A. THOMPSON   1,958,501
BROACHING MACHINE
Filed June 1, 1932   2 Sheets-Sheet 1

INVENTOR
Richard A. Thompson
BY Swan, Frye & Hardesty
ATTORNEY

May 15, 1934.  R. A. THOMPSON  1,958,501
BROACHING MACHINE
Filed June 1, 1932  2 Sheets-Sheet 2
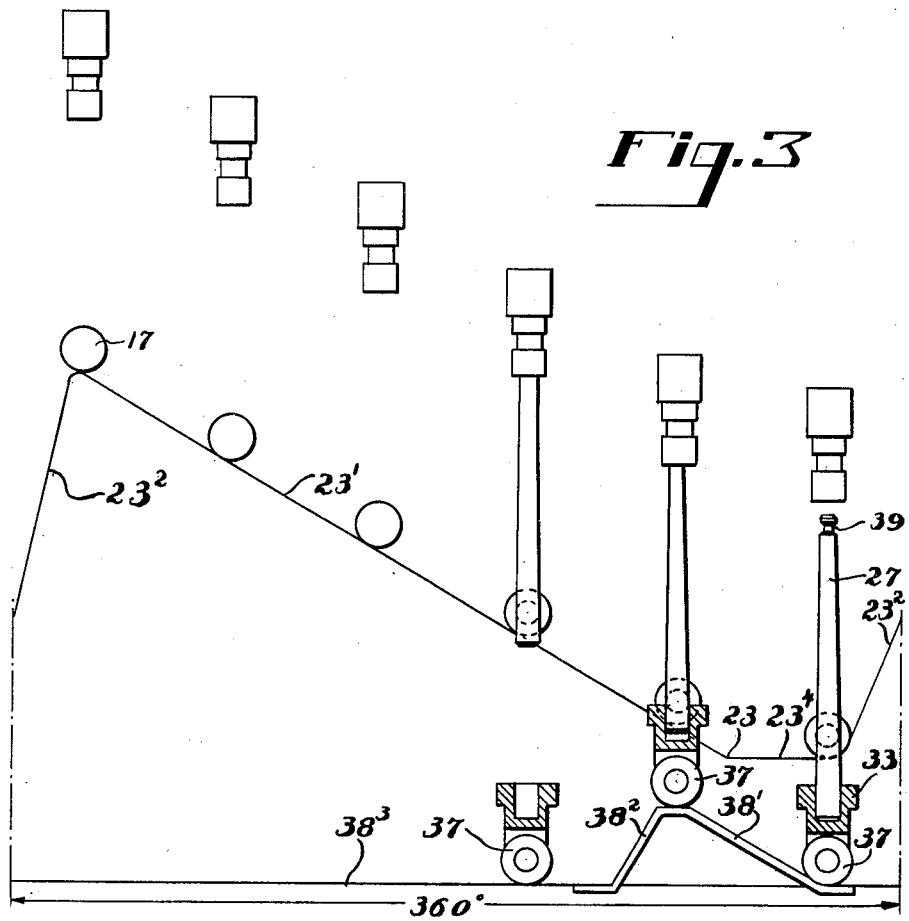
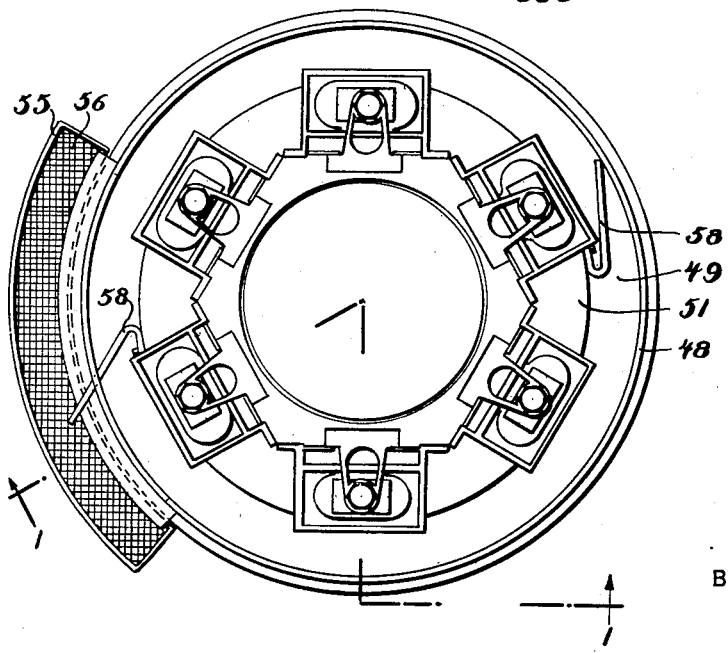
INVENTOR
Richard A. Thompson
BY Swan, Frye & Hardesty
ATTORNEY Patented May 15, 1934

1,958,501

UNITED STATES PATENT OFFICE 1,958,501

BROACHING MACHINE

Richard A. Thompson, Ann Arbor, Mich.

Application June 1, 1932, Serial No. 614,742

4 Claims. (Cl. 90—33)

This invention relates to machine tools, and particularly to an improved broaching machine adapted for continuous and rapid operation and particularly designed to provide in a single compact machine means whereby a plurality of objects may be simultaneously broached, which objects may be continuously fed into the machine in rapid succession and are automatically ejected when the work is completed.

Another object of my invention is the provision of such a machine in which each broach is automatically released upon completing its work, to enable placing new work thereover, and automatically again secured in the holding chuck after the new work is in place.

Still another object of my invention is the provision of such a broaching machine in which a single operator may stand at a fixed loading station and feed work into the machine, which work is conveyed away from the operator as the machine commences work upon it, while the empty portions which are again ready to receive work are continuously returned to the loading station, where the operator may position the work in the machine.

A still further object of my invention lies in the provision of improved means for feeding, filtering and returning to a reservoir the cutting oil used to assist the broaching operation.

Still further objects will readily occur to those skilled in the art upon reference to the following description and the accompanying drawings in which Fig. 1 is a view partly in side elevation and partly in section of a broaching machine incorporating the principles of my invention.

Fig. 2 is a top plan view thereof and

Fig. 3 is a diagrammatic view showing substantially the development of the cam controlling movement of the broaches, also showing some of the broaches and chucks in side elevation and lifting devices in section, as well as diagrammatically showing the broach inserting cam.

Figure 1:
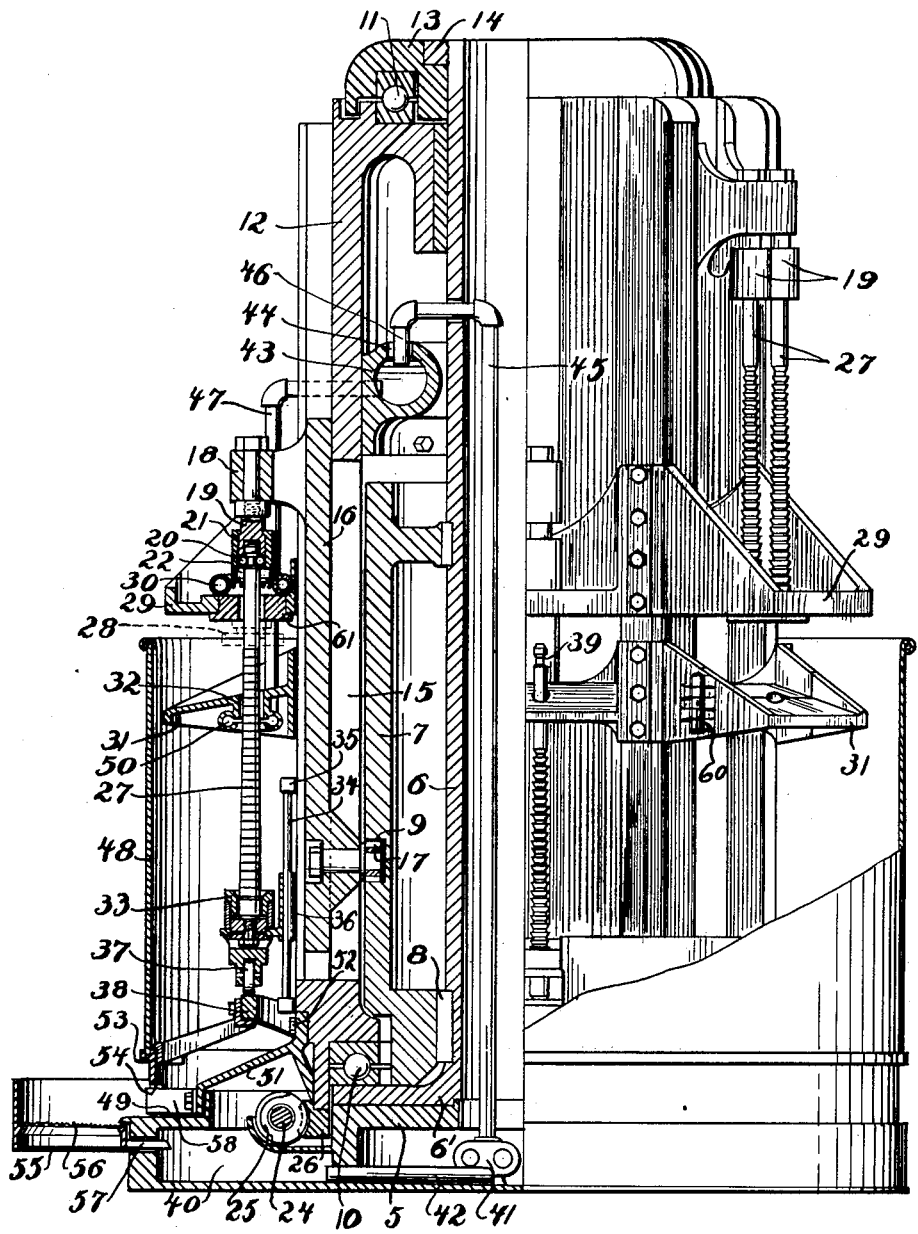

Referring now to the drawings, reference character 5 designates the bed of my invention, which supports the central upstanding fixed column 6 as well as the fixed cylindrical cam support 7, and which surrounds the column and is shown keyed thereto as at 8, and formed with a continuous cam groove 9 cut in its surface and extending peripherally thereabout.

Rotatably supported by the bed and the column, as between anti-friction bearings 10 and 11, is a rotatable frame 12. The lower anti-friction bearing 10 is trapped between the lower edge of the rotatable frame and the base flange 6' of the column, while the upper bearing is similarly positioned between the top of the rotatable frame and a cap 13 carried by the top of the column, to which it is shown secured by a nut 14.

Vertically reciprocable in suitable gibs 15 in the rotatable frame 12 are a plurality of tool holders 16, the lower extremity of each of which carries a cam follower, the roller 17 of which engages in the cam groove 9, while rigidly carried by and extending from the upper surface of each tool slide is a chuck support 18 dependingly supported by which is a ball chuck 19. The chuck shown is of the familiar type in which one or more retaining balls as 20 are forced inwardly to engage depressions in the tool, or other objects desired to be held, by a sleeve 21, which is so contoured that when moved upwardly against gravity (or any other suitable yieldable resistance) the balls are free to fall outwardly into an enlarged space as 22 in the sleeve to release the tool, which may then fall or be pulled from the chuck.

The relative contouring of the track of cam 9 is indicated diagrammatically by the line 23 in Fig. 3, and it will be seen that as the roller 17 of each tool slide follows this track, the chuck 19 and so a broach held thereby, will be vertically reciprocated thru one complete cycle in each 360 degree rotation of the rotatable frame. The frame is driven from any suitable source of power adapted to rotate the shaft 24, as an electric motor or the like (not shown). Upon the shaft is a worm 25 meshing with the worm wheel 26 carried by the periphery of the lower edge of the rotatable frame.

Any desired number of tool slides 16 may be carried by the rotatable frame, and each slide may be adapted to support any desired or practicable number of broaches. In the construction here shown, six tool slides are provided, each carrying two broach-supporting chucks. The broaches 27 are of course held in the chucks while operating upon the work and their operations upon the work are performed while they are being moved upwardly by that portion of the cam track designated 23' in the diagrammatic Figure 3. During the broaching operation the lower extremity of each broach is free, and the work, here shown as a transmission gear 28, is drawn upwardly thereby against the replaceable work bushing 61 carried by the shelf 29 which is supported by the rotatable frame 12. The shelf and work bushing are of course apertured for passage of the broach therethru, and the hole in the latter may be large enough to allow the cutting oil to flow freely downwardly therethru to the work and broach from the ring nozzle 30 which acts as a cutting oil feeder, and which will presently be more fully described. The cam 9 and broaches are so designed that each broach has been completely drawn thru the work by the time the controlling follower 17 has mounted to the highest point of the cam track, and the work then falls freely, striking the subjacent inclined shelf 31, from which it bounces or rolls to a suitable conveyor or receptacle (not shown).

The ejecting shelf 31 may be divided on a plane intersecting the axes of both broaches, the front section being hinged, as upon the hinge 60, to the rear section which is directly carried by the frame. Any suitable clamping means (not shown) may be employed for normally holding the swingable section closed. It will be seen that when it is desired to change the broaches, this operation is greatly facilitated by merely opening this the front section, which enables their being removed and installed without having to pull them thru the holes in the shelf.

After such completion of the broaching operation and release of the work, the tool slide descends, as its follower rides down the portion $23^2$ of the cam track. As the slide approaches the bottom of this portion of the cam track, the sleeve 21 of the chuck 19 strikes the shelf 29, and is thereby held against further downward movement, while the remainder of the chuck continues to descend, until the balls 20 fall outwardly into the space 22 and thus release the broach. The broach, guided by the aperture 32 and shelf 31, then falls into the cup 33 of a lifting member which is positioned immediately therebeneath and also rotates with the frame 12. The lifting member is also vertically slidable, being shown guided by a rod 34 carried by the frame as upon brackets 35, with which rod a projecting suitably apertured portion 36 of the lifting member slidably engages. Carried by and projecting from the bottom of the lifting member is a roller 37 which follows a fixed cam 38 as the frame rotates. The track of this cam is formed with a rising portion 38', positioned, in terms of an operating cycle of the machine, a suitably spaced interval after the broach has been released by the falling of the tool slide to its lowermost position. It will be noted that the cam 9 is formed with a dwell at its lowest position (designated $23^4$) in Figure 3, and it is while the follower 17 is traversing this dwell, and the broach is free of the chuck, that the operator places the new work in position over the broach. Immediately thereafter the roller 37 of the lifter 33 climbs the inclined portion of the cam 38, lifting the broach back into the chuck, during the latter portion of which rise the chuck also starts upwardly, the sleeve 21 falls, forcing the balls 30 inwardly into the groove 39 in the shank of the broach and gripping the same. The chuck then continues to pull the broach upwardly under the influence of the cam 9 in the manner previously described, performing the desired broaching operation, while the lifter falls away from the broach as the roller 37 travels back down the oppositely inclined surface $38^2$ of the cam 38, and during the remainder of its rotation about the axis of the cylindrical frame, the lifter travels over the inactive flat lower track portion $38^3$ of the cam 38.

The portion 40 of the base serves as a reservoir for cutting oil, which is pumped therefrom by the gear pump 41, driven by any suitable means (not shown). The pump draws the oil thru the connecting pipe 42 and then forces it upwardly thru the delivery pipe 45 to the annular distributing tank 43 carried by and secured to the inner surface of the rotatable frame 12. The distributing tank is formed with an annular inlet slot 44 extending thru and peripherally about its upper surface, thru which slot the down-turned extremity 46 of the delivery pipe discharges into the tank. A suitable take-off pipe as 47 conducts the oil from the distributing tank to the annular discharge nozzles 30—50 which surround the broaches at desired points and are provided with inwardly opening discharge orifices thru which jets of oil are projected by gravity against the broaches, in a manner which will be readily apparent. One such annular nozzle is shown situated above the shelf 29, and another immediately below the shelf 31, although this is optional. The lower ring nozzle subjacent the shelf 31 may be formed in two sections, one carried by the fixed and the other by the swingable part of the shelf, adapted to meet to form a complete ring when the latter portion is closed. Leakage or a certain amount of looseness of the fit at this point is of course immaterial. The cutting oil flows down inside the guard 48, and is directed into the gutter 49 by the deflector plate 51 which rotates with the frame 12, to which it is secured by cap screws 52. The supporting flange 53 of the guard is apertured at one point, as 54, and thru the aperture the oil flows into a chip pan 55, which also contains a filtering screen 56. From beneath the filtering screen the passage 57 leads back from the chip pan to the reservoir 40. One or more scrapers, as 58 may be carried by the lower edge of the deflector plate 51, the lower end of which will be seen to project into the gutter 49. The scraper assists in forcing chips from the gutter into the pan 55, and may be flexible, so that when opposite the outlet 54 it springs outwardly due to its own resiliency,—throwing the chips into the pan.

Now having described the invention and the preferred embodiment thereof, it is to be understood that said invention is to be limited, not to the specific details herein set forth, but only by the scope of the claims which follow.

I claim:

1. In a broaching machine, a hollow generally cylindrical upstanding support, a rotatable turret journaled thereon, work supporting means carried by the turret, broach holding means also carried by the turret and reciprocable relatively to the work supporting means, a cam carried by the base independently of the turret, means connecting the cam and broach holding means, means for rotating the turret, whereby the broach holding means is reciprocated relatively to the work supporting means as the turret turns, a cutting fluid reservoir within the support near its bottom, pumping means for the fluid, an upwardly extending fixed delivery pipe having a downwardly discharging upper end, and an elevated annular gravity feed tank carried by and inside the turret and having a continuous annular opening in its top into which the feed pipe may discharge while the turret is rotating.

2. In a broaching machine, an upstanding cylindrical support, a sleeve-like turret circumscribing and rotatably journaled upon the support, a plurality of work supporting abutment members carried by the turret, a plurality of broach holding members also carried by the turret and vertically reciprocable relatively to the work holders, a shaft cam carried by the support independently of the turret, follower means engaging the cam and connected to the broach holders, the support having a portion overhanging and a portion underlying the turret, thrust bearings between the turret and such overhanging and underlying portions; means for turning the turret, whereby upon turning the turret the broach holders are reciprocated relatively to the work supports, a second cam also non-rotatable with the turret, and means carried by the turret beneath each broach adapted to follow the second cam for conveying the broach to the broach holding means.

3. In a broaching machine, an upstanding generally cylindrical support, a rotatable turret journaled thereon, a plurality of work holding abutment members carried by the turret, a plurality of broach holding chucks also carried by the turret, one being in alignment with each work holding member, means for rotating the turret, means including a cam carried by the support for reciprocating the chucks relatively to the work holders as the turret revolves, means including an abutment carried by the frame to operate each chuck in response to movement thereof as it approaches the end of its travel for opening the same to release a broach held thereby, and cam operated means for returning the broach to the chuck upon further rotation of the turret, the support having a portion underlying the turret and carrying said last mentioned cam means; another portion carried by the support and overhanging the turret, and thrust bearing between the turret and such overhanging and underlying portions.

4. In a broaching machine, a hollow fixed cylindrical support, a rotatable support carried thereby, means for turning the rotatable support, work holding means carried by the rotatable support, tool holding means also carried thereby, means for reciprocating one holding means relatively to the other as said support turns, and means for feeding cutting fluid to the rotatable support from the fixed support, including an annular gravity feed tank carried by the rotatable support and having a continuous annular slot in its top, and a discharge conduit opening into said slot.

RICHARD A. THOMPSON.